United States Patent
Baaser et al.

(10) Patent No.: US 8,129,056 B2
(45) Date of Patent: Mar. 6, 2012

(54) SYSTEM AND METHOD FOR CONTROLLING AN ANODE SIDE RECIRCULATION PUMP IN A FUEL CELL SYSTEM

(75) Inventors: Bernhard Baaser, Milford, MI (US); Volker Formanski, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 770 days.

(21) Appl. No.: 12/115,702

(22) Filed: May 6, 2008

(65) Prior Publication Data

US 2009/0280373 A1 Nov. 12, 2009

(51) Int. Cl.
*H01M 8/04* (2006.01)
*G01P 3/00* (2006.01)
(52) U.S. Cl. .................. 429/415; 702/145; 702/147
(58) Field of Classification Search .............. 429/408, 429/415, 428, 433, 442, 443, 444, 446, 544, 429/545, 456; 702/145, 147
See application file for complete search history.

(56) References Cited

U.S. PATENT DOCUMENTS 7,192,668 B2 * 3/2007 Dehne ..................... 429/414
2004/0214059 A1 * 10/2004 Enjoji et al. ............... 429/22

OTHER PUBLICATIONS

Nakayama, Y. Introduction to Fluid Mechanics 2000.*

* cited by examiner

*Primary Examiner* — Jerry Lorengo
*Assistant Examiner* — Carlos Barcena
(74) *Attorney, Agent, or Firm* — John A. Miller; Miller IP Group, PLC

(57) ABSTRACT

A system and method for controlling the speed of a recirculation pump in an anode recirculation loop of a fuel cell system based on a predetermined ratio of fresh hydrogen to recirculated anode gas. The system uses a model to determine the volume flow of the recirculated gas through a fuel cell stack to determine the recirculation rate based on a measured temperature of the recirculated gas, a measured pressure drop across a recirculation pump, a pressure drop across the anode inlet and outlet of the stack, a percentage of hydrogen in the recirculated gas, and the density of the recirculated gas.

20 Claims, 3 Drawing Sheets

SYSTEM AND METHOD FOR CONTROLLING AN ANODE SIDE RECIRCULATION PUMP IN A FUEL CELL SYSTEM

BACKGROUND OF THE INVENTION

1. Field of the Invention

This invention relates generally to a method for controlling the speed of a recirculation pump in an anode recirculation loop of a fuel cell system and, more particularly, to a method for controlling the speed of a recirculation pump in an anode recirculation loop of a fuel cell system to provide the proper ratio of fresh hydrogen to recirculated anode gas, where the method includes using a mathematical model based on system parameters.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of flow field or bipolar plates positioned between the several MEAs in the stack. The bipolar plates include an anode side and a cathode side for adjacent fuel cells in the stack. Anode reactant gas flow channels are provided on the anode side of the bipolar plates that allow the anode gas to flow to the anode side of the MEA. Cathode reactant gas flow channels are provided on the cathode side of the bipolar plates that allow the cathode gas to flow to the cathode side of the MEA. The bipolar plates also include flow channels through which a cooling fluid flows.

It is desirable that the distribution of hydrogen within the anode flow channels in the fuel cell stack be substantially constant for proper fuel cell stack operation. Therefore, it is known in the art to input more hydrogen into the fuel cell stack than is necessary for a certain output load of the stack so that the anode gas distribution is proper. However, because of this requirement, the amount of hydrogen in the anode exhaust gas is significant, and would lead to low system efficiency if that hydrogen was discarded. Further, hydrogen gas in a sufficient quantity discharged to the environment could cause certain problems because of the explosive nature of hydrogen. Therefore, it is known in the art to recirculate the anode exhaust gas back to the anode input to reuse the discarded hydrogen.

The MEAs are permeable and thus allow nitrogen in the air from the cathode side of the stack to permeate therethrough and collect in the anode side of the stack, referred to in the industry as nitrogen cross-over. Nitrogen in the anode side of the fuel cell stack dilutes the hydrogen such that if the nitrogen concentration increases beyond a certain percentage, such as 50%, the fuel cell stack becomes less efficient, unstable or may fail. It is known in the art to provide a bleed valve at the anode gas output of the fuel cell stack to remove nitrogen from the anode side of the stack. The bleed hydrogen can be sent to any suitable location, such as a converter or the environment.

In order to operate the fuel cell stack under optimized conditions and to maximize system performance, a great enough amount of hydrogen in the anode recirculation gas and a certain recirculation rate need to be achieved. However, there are currently no hydrogen concentration sensors or flow rate sensors for a humid environment suitable for a fuel cell system. Therefore, a direct controllability of the operation parameter recycle flow and anode hydrogen concentration is not possible.

SUMMARY OF THE INVENTION

In accordance with the teachings of the present invention, a system and method are disclosed for controlling the speed of a recirculation pump in an anode recirculation loop of a fuel cell system based on a predetermined ratio of fresh hydrogen to recirculated anode gas. The method includes measuring the pressure drop across the recirculation pump and measuring the temperature of the recirculated gas flowing through the recirculation loop. The method further includes calculating a volume flow of the recirculated gas through the anode side of a fuel cell stack as a function of a calculated pressure drop across the anode side of the stack, the percentage of hydrogen in the recirculated gas, the measured temperature and the measured pressure. The method calculates the pressure drop across the anode side of the stack using the measured pressure, and the pressure drop across a water separator in the recirculation loop and piping in the recirculation loop. The density of the recirculated gas is calculated from the volume flow of the recirculated gas through the anode side of the stack, the measured pressure drop and the speed of the pump. The method calculates the percentage of hydrogen in the recirculation gas from the density of the recirculated gas, the measured temperature and the measured pressure. By cycling through the calculations for the percentage of hydrogen in the recirculated gas, the volume flow through the anode side of the stack and the density, an accurate value for the recirculation rate in the recirculation loop can be provided.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for determining the speed of an anode recirculation pump in a fuel cell system is merely exemplary in nature, and is in no way intended to limit the invention or its applications or uses.

Figure 1:
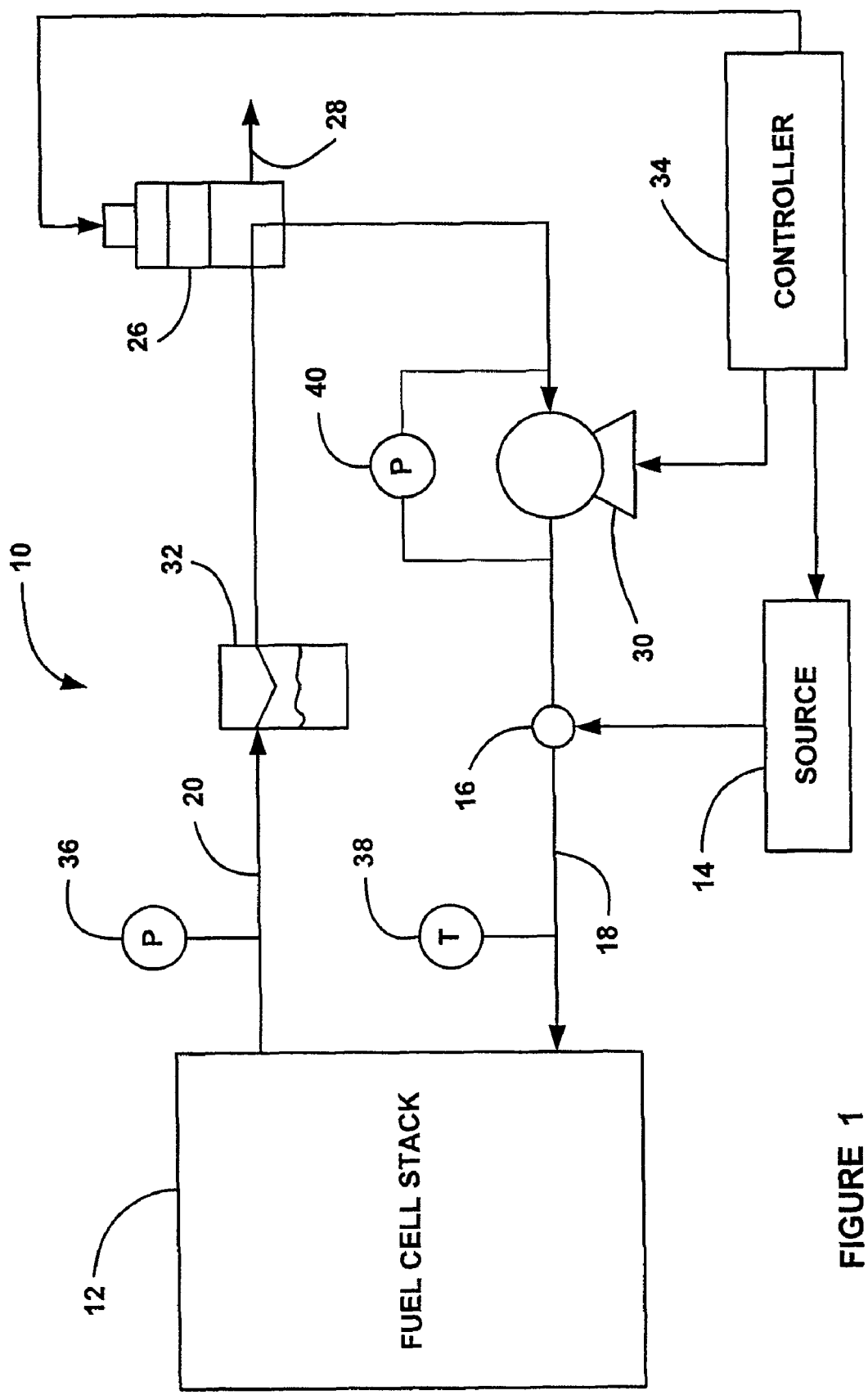
FIG. 1 is a schematic diagram of an anode recirculation loop in a fuel cell system that employs a control technique for controlling the speed of a recirculation pump and a bleed valve, according to an embodiment of the present invention.

FIG. 1 is a schematic diagram of a fuel cell system 10 including a fuel cell stack 12. Hydrogen gas from a hydrogen source 14 is provided to a mixing junction 16 and then sent to the anode side of the fuel cell stack 12 on line 18. An anode exhaust gas is output from the fuel cell stack 12 on line 20 and is sent to a bleed valve 26. A recirculation pump 30 pumps the anode exhaust gas through the valve 26 to the mixing junction 16 to be mixed with the fresh hydrogen from the source 14 to provide an anode recirculation loop. The pressure within the recirculation loop needs to be controlled so that it is about equal to the pressure on the cathode side of the stack 12. The proper mixture of the fresh hydrogen from the source 14 and the recirculated anode exhaust gas at the mixing junction 16 sets the pressure of the anode side of the stack 12.

As discussed above, nitrogen cross-over from the cathode side of the fuel cell stack 12 dilutes the hydrogen in the anode side that affects stack performance. Therefore, it is necessary to periodically bleed the anode exhaust gas to reduce the amount of nitrogen being recirculated. During the nitrogen bleed, the valve 26 is controlled to switch the anode exhaust gas from the recirculation loop to an exhaust line 28. It is beneficial to adapt the recirculation rate of the anode gas to the fuel cell load and the hydrogen feed gas flow to support water management and to reduce parasitic loads on the fuel cell system.

In order to monitor the anode gas recirculation, various sensors are provided in the system 10. Particularly, a pressure sensor 36 measures the pressure in the anode recirculation loop in the line 20 and a pressure sensor 40 measures the pressure across the recirculation pump 30. Further, a temperature sensor 38 measures the temperature of the recirculation gas in the recirculation loop in the line 18. Also, a water trap 32 removes by-product water from the anode exhaust gas. The water vapor that is present in the anode exhaust gas that is recirculated back to the input line 18 helps with the necessary stack membrane humidification. A controller 34 controls the amount of fresh hydrogen from the source 14, the speed of the pump 30 and the position of the bleed valve 26 based on the discussion below. The controller 34 also receives measurement signals from the pressure sensors 36 and 40 and the temperature sensor 38.

Based on the discussion above, it is desirable for the controller 34 to know when to provide an anode exhaust gas bleed to the exhaust line 28, and to determine the speed of the pump 30 to provide the proper mixture of recirculated hydrogen and fresh hydrogen for stack load and the like without using a hydrogen concentration sensor and a recirculation flow sensor. According to the invention, a mathematical model is developed for determining the concentration of hydrogen in the recirculation loop and the proper speed of the recirculation pump 30. If the concentration of hydrogen in the recirculation loop falls below a predetermined value, such as 70%, then the controller 34 will open the bleed valve 26 for some predetermined period of time to reduce the amount of nitrogen. In one embodiment, the desirable recirculation rate based on certain system parameters. Thus, if the recirculation rate indicates that too much recirculated anode gas is in the recirculation loop, the controller 34 will reduce the speed of the pump 30. Likewise, if the controller 34 determines that the recirculated anode gas has too much fresh hydrogen, it will increase the speed of the pump 30. The amount of fresh hydrogen being introduced into the recirculation loop depends on the stack load.

Figure 2:
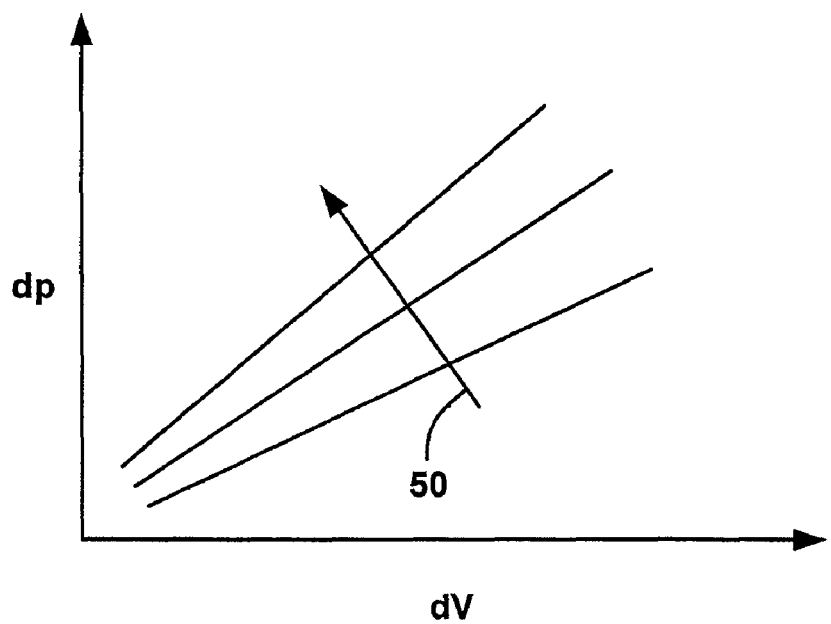
FIG. 2 is a graph with change in volume on the horizontal axis and change in pressure across the anode inlet and outlet on the vertical axis showing pressure and volume changes based on an increase of nitrogen in the anode recirculation gas.

FIG. 2 is a graph with change in volume flow of the hydrogen recirculation gas on the horizontal axis and the change in pressure of the anode gas across the inlet and the outlet of the stack 12. FIG. 2 shows that for the same volume flow of the anode recirculation gas in the recirculation loop, the pressure across the inlet and outlet of the stack 12 goes up along line 50 as the nitrogen within the anode recirculation gas increases as a result of the increased viscosity of the recirculation gas. Equations (1)-(10) below show the relationship between the change in pressure $\Delta p$ across the inlet and outlet of the stack 12, the change in the volume flow $\dot{V}$ through the stack 12 and the concentration of hydrogen in the recirculation gas.

$$\Delta p = \lambda \cdot \frac{l}{d_h} \cdot \frac{\overline{\rho}}{2} \cdot \overline{w}^2 \qquad (1)$$

Where, $$\lambda = \varphi \cdot \frac{64}{Re} \qquad (2)$$

and, $$Re = \frac{\overline{w} \cdot d_h}{\overline{v}} = \frac{\overline{w} \cdot d_h \cdot \overline{\rho}}{\overline{\mu}} \qquad (3)$$

From this:

$$\Delta p = k \cdot \overline{\mu} \cdot \dot{\overline{V}} \cdot \frac{(d_{channel} + h_{channel})^2}{n_{channel} \cdot n_{cells} \cdot (d_{channel} \cdot h_{channel})^3}. \qquad (4)$$

Where, $$\dot{\overline{V}} = \frac{1}{2} \cdot (\dot{V}_{in} + \dot{V}_{out}) \qquad (5)$$

and, $$\overline{\mu} = \frac{1}{2} \cdot \left( \sum_i y_{i,in} \cdot \mu_{i,in}(T) + \sum_i y_{i,out} \cdot \mu_{i,out}(T) \right). \qquad (6)$$

In equations (1)-(6), k is a constant geometric parameter, $\lambda$ is the pressure drop loss coefficient for tube roughness, $d_h$ is the hydraulic diameter of the pump 30, $\rho$ is the density of the gas, $\varphi$ is a flow coefficient, $\overline{w}$ is the average gas velocity, $\overline{v}$ is the kinematic viscosity, l is the tube length, Re is the Reynolds number, A is the area of the tube, U is the perimeter distance of the tube, y is the molecular gas fraction component, k is a predetermined constant based on stack design, $\bar{\mu}$ is the dynamic viscosity of the recirculation gas. As is known in the art, the dynamic viscosity $\bar{\mu}$ is a function of the gas fraction $y_i$ and temperature T of the recirculation gas.

Figure 3:
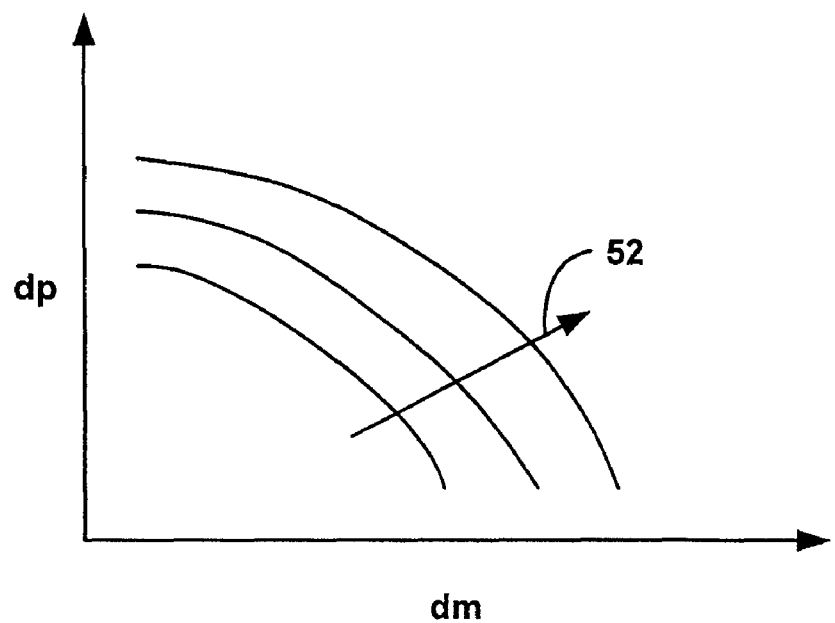
FIG. 3 is a graph with change in mass on the horizontal axis and change in pressure across the recirculation pump on the vertical axis showing that gas density changes as the amount of nitrogen in the recirculation gas changes.

In order to determine the speed of the recirculation pump 30 based on the model, the recirculation pump 30 needs to be mapped. FIG. 3 is a graph with change in mass flow of the recirculation gas on the horizontal axis and change in the pressure drop across the pump 30, as would be measured by the pressure sensor 40. As either the speed n of the pump 30 or the density $\rho$ of the recirculation gas increases, as a result of changing levels of nitrogen along line 52, the relationship between the mass flow of the recirculation gas through the recirculation pump 30 and the pressure drop across the pump 30 is shown by this figure.

Based on the relationship between the pressure drop across the pump 30 and the mass flow of the recirculation gas through the pump 30, a pressure coefficient $\psi$ can be defined as.

$$\psi = \frac{2 \cdot Y}{u^2} = \frac{2 \cdot Y}{(n \cdot D \cdot \pi)^2} \approx \frac{2 \cdot \Delta p}{\rho \cdot (n \cdot D \cdot \pi)^2} \quad (7)$$

Where, $$Y = \Delta h + \frac{c_2^2 - c_1^2}{2} \quad (8)$$

and, $$\Delta h = \frac{\kappa}{\kappa - 1} \cdot R \cdot T_1 \cdot \left[ \left( \frac{p_2}{p_1} \right)^{\frac{\kappa-1}{\kappa}} - 1 \right] \quad (9)$$

Where Y is the specific isentropic entropy rise, i.e., the work that has been done to the gas by the pump 30 while it is being compressed, h is the specific enthalpy, $c_2$ is the speed of the gas at the pump outlet, $c_1$ is the speed of the gas at the pump inlet, n is the speed of the pump 30, u is the rotational speed of the impeller in the pump 30, D is the diameter of the impeller in the pump 30, p is the pressure drop across the pump 30 and $\rho$ is the density of the recirculation gas. The density $\rho$ of the recirculation gas is a function of the concentration of hydrogen in the recirculation gas and the pressure p.

For small pressure ratios, the specific enthalpy h can be simplified as:

$$\Delta h = \frac{\Delta p}{\rho} \quad (10)$$

Further, based on the relationship between the pressure drop across the pump 30 and a mass flow of the recirculation gas through the pump 30, a flow coefficient $\phi$ can be defined as follows. The definition of density is given as:

$$\rho = \frac{m}{V} \quad (11)$$

The molecular weight MW of a specific gas is given as:

$$m = n \cdot MW \quad (12)$$

Which gives the volume flow V as:

$$V = \frac{nRT}{p} \quad (13)$$

Where R is the gas constant. From this:

$$\rho = p \cdot \frac{\sum n_i \cdot MW_i}{nRT} = p \cdot \frac{\sum \frac{n_i}{n} \cdot MW_i}{RT} \quad (14)$$

Where $$\frac{n_i}{n}$$

gives the actual fractions of the specific gases. This gives:

$$\varphi = \frac{4\dot{V}_2}{D^3 \cdot \pi^2 \cdot n} \quad (15)$$

$$\rho = f(y_i, p) \quad (16)$$

Figure 4:
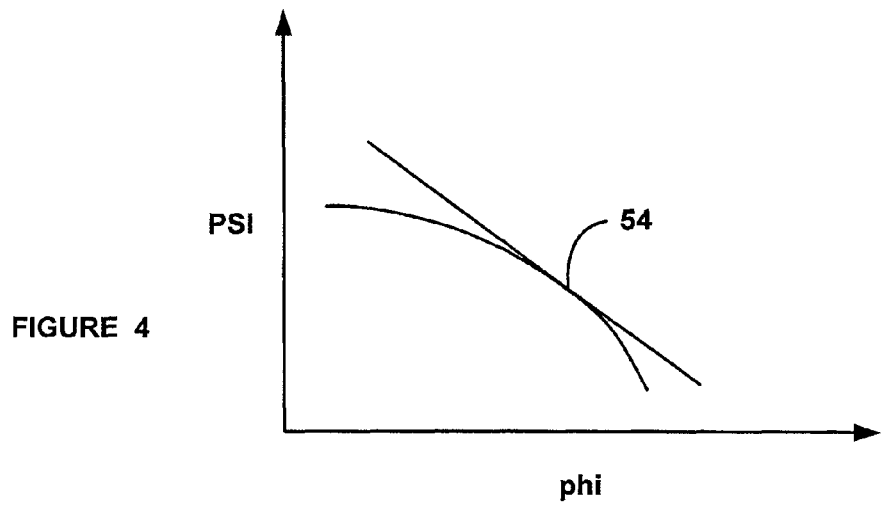
FIG. 4 is a graph with flow coefficient on the horizontal axis and pressure coefficient on the vertical axis showing a working area of the hydrogen recirculation gas.

FIG. 4 is a graph with the flow coefficient $\phi$ on the horizontal axis and the pressure coefficient $\psi$ on the vertical axis showing the normalized relationship between the coefficients. A point 54 identifies the working area of the recirculation pump 30 to provide the mapping, according to the invention.

The flow of the recirculation gas through the piping in the recirculation loop is typically a laminar flow, and can be assigned a constant pressure drop $c_{piping}$ depending on the test measurements of the system. The pressure drop $\Delta p_{pump}$ across the recirculation pump 30 is measured by the pressure sensor 40. In one non-limiting embodiment, the water separator 32 is a cyclone-type water separator that uses a spinning mechanism to remove the water, and has a turbulent flow. The pressure drop $\Delta p_{separator}$ across the separator 32 can be determined by a parabolic relationship. From these values, the pressure drop $p_{anode}$ across the anode side of the stack 12 from the inlet line 18 to the outlet line 20 can be determined as:

$$\Delta p_{anode} = (1 - c_{piping}) \cdot (\Delta p_{pump} - \Delta p_{separator}) \quad (17)$$

Figure 5:
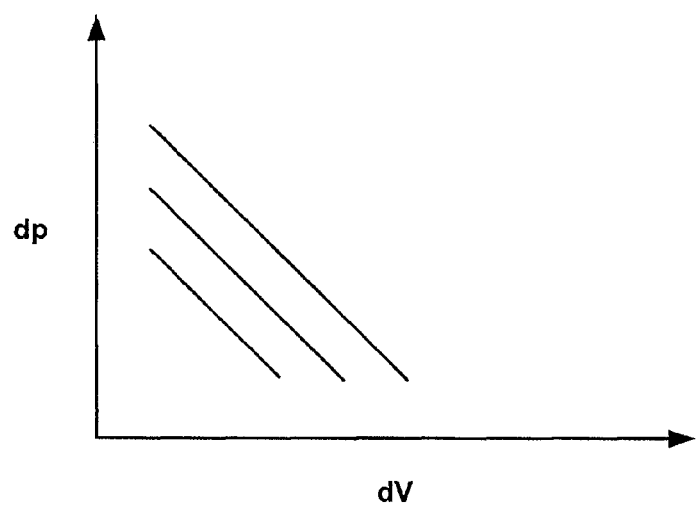
FIG. 5 is a graph with change in volume on the horizontal axis and change in pressure across the recirculation pump on the vertical axis.
Figure 6:
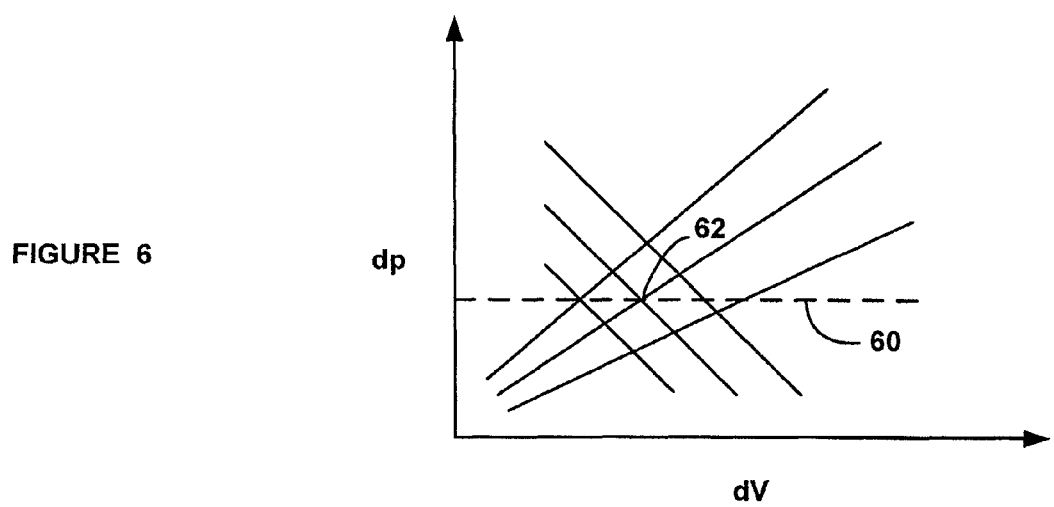
FIG. 6 is a graph with change in volume on the horizontal axis and change in pressure on the vertical axis.

From FIG. 2, the stack characteristics of the relationship between the pressure drop across the anode side of the stack 12 and the volume flow of the anode gas through the stack 12 is given based on the increase in nitrogen content in the recirculation gas. FIG. 5 is a graph with volume flow through the recirculation pump 30 on the horizontal axis and pressure drop across the recirculation pump 30 on the vertical axis for increasing nitrogen content in the recirculation gas. Combining FIG. 2 and FIG. 5 gives the graph shown in FIG. 6. The measured pressure drop is provided on line 60, and defines a working point 62.

Based on the model above, the percentage of hydrogen fraction $y_{H2}$ in the recirculation gas is a function of the density $\rho$ of the recirculation gas flowing through the recirculation pump 30, the temperature T measured by the temperature sensor 38 and the pressure p measured by the pressure sensor 36. To determine the percentage of the hydrogen fraction $y_{H2}$ in the recirculation gas based on the model above, an arbitrary hydrogen percentage value is put into the algorithm, such as 70%. Using this percentage, the volume flow V of the recirculation gas through the anode side of the stack 12 is calculated as a function of the pressure drop across the anode inlet and outlet, the percentage of hydrogen fraction $y_{H2}$ in the recirculation gas, the temperature T measured by the temperature sensor 38 and the pressure p measured by the pressure sensor 36.

The volume flow V through the stack 12 is used to determine the pressure drop $\Delta p_{separator}$ across the water separator 32. The pressure drop $\Delta p_{separator}$ across the water separator 32, the pressure drop $c_{piping}$ across the pipes and the measured pressure drop $\Delta p_{pump}$ across the recirculation pump 30 are used to determine the pressure drop $\Delta p_{anode}$ across the anode inlet and outlet based on equation (17). The pressure drop across the anode inlet and outlet is then used to determine the stack volume flow V by equation (4). The stack volume flow V is then used to determine the density $\rho$ of the recirculation gas flowing through the recirculation pump 30 in combination with the pressure drop measured by the pressure sensor 40 and the speed n of the pump 30. The density $\rho$ is then used to determine the percentage of hydrogen fraction $y_{H2}$ in the recirculation gas, as discussed above. The stack volume flow V can be used to define the recirculation rate where the volume flow V is divided by the volume flow of fresh hydrogen fed to the junction 16.

As the algorithm cycles through this loop a few times, eventually the algorithm will accurately calculate the percentage of hydrogen fraction $y_{H2}$ in the recirculation gas and the volume flow V of the recirculation gas through the stack 12. The system 10 will then use the percentage of hydrogen fraction $y_{H2}$ in the recirculation gas to determine when it is necessary to open the bleed valve 26 to remove nitrogen based on predetermined parameters and the speed n of the pump 30 so that the desired mixture of fresh hydrogen to recirculated gas is achieved.

The discussion above describes some specific formulas and equations to calculate various parameters of the system. However, as will be appreciated by those skilled in the art, there are other ways of calculating the various parameters, including the use of look-up tables.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining the speed of a recirculation pump in an anode recirculation loop of a fuel cell stack based on a predetermined ratio of fresh hydrogen to recirculated hydrogen, said method comprising:
   measuring the pressure drop across the recirculation pump;
   measuring the temperature of the anode recirculation gas flowing through the recirculation loop;
   feeding fresh hydrogen into the recirculation loop;
   calculating the pressure drop across the anode side of the stack;
   calculating the volume flow of the recirculation gas through the anode side of the stack as a function of the calculated pressure drop across the anode side of the stack, the percentage of hydrogen in the recirculation gas, the measured temperature of the anode recirculation gas flowing through the recirculation loop and the measured pressure drop across the recirculation pump; and
   using the calculated volume flow and the amount of fresh hydrogen being fed into the recirculation loop to determine the speed of the pump to achieve the predetermined ratio.

2. The method according to claim 1 wherein calculating the pressure drop across the anode side of the stack includes using the measured pressure.

3. The method according to claim 2 wherein calculating the pressure drop across the anode side of the stack includes determining and using the pressure drop across a water separator in the recirculation loop that removes water from the recirculation gas.

4. The method according to claim 3 wherein calculating the pressure drop across the anode side of the stack includes determining and using the pressure drop across piping in the recirculation loop.

5. The method according to claim 4 wherein calculating the pressure drop across the anode side of the stack includes using the equation:

$$\Delta p_{anode} = (1 - c_{piping}) \cdot (\Delta p_{pump} - \Delta p_{separator})$$

where $\Delta p_{anode}$ is the pressure drop across the anode side of the stack, $c_{piping}$ is the pressure drop across the piping in the recirculation loop, $\Delta p_{pump}$ is the measured pressure drop across the pump and $\Delta p_{separator}$ is the pressure drop across the water separator.

6. The method according to claim 1 further comprising calculating the density of the recirculation gas flowing through the recirculation loop using the calculated volume flow, the measured pressure drop and the speed of the pump.

7. The method according to claim 6 wherein the density of the recirculation gas is calculated by the equation:

$$\rho = p \cdot \frac{\sum n_i \cdot MW_i}{nRT} = p \cdot \frac{\sum \frac{n_i}{n} \cdot MW_i}{RT}$$

where n is the speed of the pump, $\rho$ is the density, p is the measured pressure, T is the measured temperature and MW is the molecular weight of the gas.

8. The method according to claim 6 further comprising calculating the percentage of hydrogen in the recirculation gas as a function of the density of the recirculation gas flowing through the recirculation pump, the measured temperature and the measured pressure.

9. The method according to claim 8 wherein an accurate value for the volume flow of the recirculation gas through the anode side of the stack and the percentage of hydrogen in the recirculation gas is provided after a few cycles of calculating the percentage of hydrogen in the recirculation gas, calculating the volume flow of the recirculation gas of the anode side of the stack and calculating the density of the recirculation gas.

10. A fuel cell system comprising:
   a fuel cell stack;
   a recirculation loop for recirculating anode exhaust gas from the stack to an anode inlet;
   a source of fresh hydrogen;
   a mixing junction for mixing the fresh hydrogen with the recirculated gas;
   a recirculation pump for pumping the recirculation gas through the recirculation loop;
   a temperature sensor for measuring the temperature of the recirculation gas in the recirculation loop;
   a pressure sensor for measuring the pressure drop across the recirculation pump; and a controller programmed to control the speed of the pump to control the ratio of fresh hydrogen to recirculated hydrogen, said controller calculating the pressure drop across the anode side of the stack, calculating the volume flow of the recirculated gas through the anode side of the stack as a function of the calculated pressure drop across the anode side of the stack, the percentage of hydrogen in the recirculation gas, the measured temperature of the anode recirculation gas flowing through the recirculation loop and the measured pressure drop across the recirculation pump, and using the calculated volume flow to determine the speed of the pump to achieve a predetermined ratio of fresh hydrogen to recirculated hydrogen.

11. The system according to claim 10 wherein the controller calculates the pressure drop across the anode side of the stack using the measured pressure.

12. The system according to claim 11 further comprising a water separator for removing water from the recirculated gas, said controller calculating the pressure drop across the anode side of the stack by determining and using the pressure drop across the water separator.

13. The system according to claim 12 wherein the controller calculates the pressure drop across the anode side of the stack by determining and using the pressure drop across piping in the recirculation loop.

14. The system according to claim 13 wherein the controller calculates the pressure drop across the anode side of the stack by using the equation:

$$\Delta p_{anode} = (1 - c_{piping}) \cdot (\Delta p_{pump} - \Delta p_{separator})$$

where $\Delta p_{anode}$ is the pressure drop across the anode side of the stack, $c_{piping}$ is the pressure drop across the piping in the recirculation loop, $\Delta p_{pump}$ is the measured pressure drop across the pump and $\Delta p_{separator}$ is the pressure drop across the water separator.

15. The system according to claim 10 wherein the controller calculates the density of the recirculation gas flowing through the recirculation pump using the calculated volume flow, the measured pressure drop and the speed of the pump.

16. The system according to claim 15 wherein the controller calculates the density of the recirculation gas by the equation:

$$\rho = p \cdot \frac{\sum n_i \cdot MW_i}{nRT} = p \cdot \frac{\sum \frac{n_i}{n} \cdot MW_i}{RT}$$

where n is the speed of the pump, $\rho$ is the density, p is the measured pressure, T is the measured temperature and MW is the molecular weight of the gas.

17. The system according to claim 15 wherein the controller calculates the percentage of hydrogen in the recirculation gas as a function of the density of the recirculation gas flowing through the recirculation pump, the measured temperature and the measured pressure.

18. The system according to claim 17 wherein the controller calculates an accurate value for the volume flow of the recirculation gas through the anode side of the stack and the percentage of hydrogen in the recirculation gas after a few cycles of calculating the percentage of hydrogen in the recirculation gas, calculating the volume flow of the recirculation gas of the anode side of the stack and calculating the density of the recirculation gas.

19. A fuel cell system comprising:
a fuel cell stack;
a recirculation loop for recirculating anode exhaust gas from the stack to an anode inlet;
a source of fresh hydrogen;
a mixing junction for mixing the fresh hydrogen with the recirculated gas;
a recirculation pump for pumping the recirculation gas through the recirculation loop;
a temperature sensor for measuring the temperature of the recirculation gas in the recirculation loop;
a pressure sensor for measuring the pressure drop across the recirculation pump; and
a controller programmed to control the speed of the pump to control the ratio of fresh hydrogen to recirculated hydrogen, said controller using a model to determine the speed of the pump based on the measured temperature of the anode recirculation gas in the recirculation loop, the measured pressure drop across the recirculation pump, the concentration of hydrogen in the recirculated gas, the volume flow of the recirculated gas through the stack, the pressure drop across the anode inlet and outlet of the stack and the density of the recirculated gas.

20. The system according to claim 19 further comprising a water separator for removing water from the recirculated gas, said controller calculating the pressure drop across the anode side of the stack using the pressure drop across the water separator, a pressure drop across piping in the recirculation loop and the measured pressure.

* * * * *